Jan. 31, 1928.
G. H. FORSYTH
1,657,533
DISK WHEEL
Filed May 6, 1922
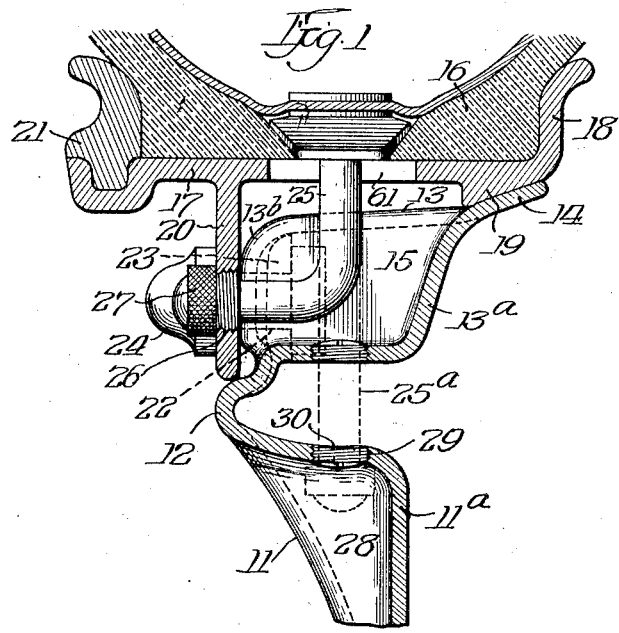
Witness:
Inventor
George H. Forsyth
By Cromwell, Greist & Warden
Attys.

Patented Jan. 31, 1928.

1,657,533

UNITED STATES PATENT OFFICE.

GEORGE H. FORSYTH, OF CHICAGO, ILLINOIS, ASSIGNOR TO MOTOR WHEEL CORPORATION, OF LANSING, MICHIGAN, A CORPORATION OF MICHIGAN.

DISK WHEEL.

Application filed May 6, 1922. Serial No. 558,929.

This application is directed to subject-matter disclosed in and divided out of my co-pending applications Serial No. 396,776 filed July 16, 1920, Serial No. 465,943, filed April 30, 1921, and Serial No. 484,008, filed July 11, 1921.

This invention has to do with disk wheels and particularly those equipped with demountable rims for carrying pneumatic tires, and has for its primary object the assembly of the rim, tire and valve stem with the wheel disk in such manner as to provide both for easy access to the valve for inflation of the tire while on the wheel and for ready removal of the rim and tire from the wheel in a lateral direction without interference between the valve stem and disk; also for the optional use on the one wheel of tires equipped with either straight or angle valve stems; also the safeguarding of the valve stem from injury by reason of relative movement of the disk and stem in use or from inaccuracy of assembly.

Other objects and advantages of the invention will be apparent to those skilled in the art from the detailed description of certain embodiments of the invention illustrated in the accompanying drawing, by way of exemplification only.

In the drawing—

Fig. 1 is a radial section through a portion of the periphery of a wheel embodying one form of the invention;

Fig. 2 is a similar section through a second embodiment; and

Fig. 3 is a similar section through still another embodiment of the invention.

Having particular reference to Fig. 1 of the drawing, the wheel disk is indicated at 11 provided with an annular shoulder, step or bead at 12 and rearwardly offset at 13 and marginally inclined to the wheel axis to form a rear rim-retaining stop at 14. The section being taken in Fig. 1 at the valve stem, the portion 13 of the disk appears as rearwardly deflected at 13ª to form a pocket 15 for the protective housing of the stem of the ordinary pneumatic tire 16, as will be treated further hereinafter.

Mounted upon the periphery of the wheel is a tire-supporting member represented in Fig. 1 as a tire-carrying rim 17 having along its rear edge a permanent tire-retaining bead 18 and upon its inner face adjacent the rear edge a portion 19 inclined to the wheel axis at an angle corresponding substantially to the inclined margin 14 of the disk upon which it has an inward constrictive bearing.

In front of the bearing portion 19 and preferably in front of the median line of the rim there is provided an inwardly extending rim-retaining flange 20 shown as formed integrally with the rim although, obviously, it may be separately formed and fixedly secured thereto or independent of and bearing against the rim as with the usual rim-retaining ring or clip. This flange extends in front of the disk portion 13ᵇ and is arranged to have a lateral bearing thereagainst, the flange serving as a means of attachment for the rim to the wheel in a manner equivalent to that of the ordinary rim-retaining ring or clip. Forwardly of the flange 20 the rim is lipped to receive the removable beaded tire-retaining element 21, although the beads front and rear may be permanently associated with the rim.

The rim is attached to the disk of the wheel by means of bolts 22 the head portions of which, either directly or by means of washers 23, bear upon the rear face of the disk adjacent the bend thereof and, as the bolts are drawn home by means of their nuts 24, tend to flatten the bend of the disk and thus impart to the latter a nut locking function to prevent the loosening of the nuts 24. Incidentally the flattening of the angle at the bend of the disk tends to throw the marginal portion 14 of the disk outwardly against the portion 19 of the rim, increasing the reaction between the disk and rim whereby the former is subjected to radial compressive stress.

As shown in full lines in Fig. 1, the offset valve steam 25 is protectively accommodated within the pocket 15 between the side walls thereof and has its outer end extending through the slot-like opening between the disk portions 13 and 13ᵇ through a threaded aperture 26 of the rim-retaining flange 20, its end being closed by the valve cap 27 which telescopes over the same providing lateral play therebetween and which is threaded into the opening 26, thus giving convenient access to the valve stem from the front of the wheel and permitting the rim, tire and valve stem to be removed laterally from the wheel. The disk may also be provided inwardly of the shoulder 12 with a rearwardly cupped pocket as indicated at 28 in line with the valve stem axis, the upper wall of the pocket being provided with a threaded aperture 29 for the accommodation of the ordinary valve stem indicated by dotted lines at 25ª. Whether a straight or offset valve stem be associated with the tire in use, that threaded aperture which is not in use may be closed by a threaded plug 30 which is adapted to fit any one of the apertures.

In Fig. 2 is illustrated a portion of a single disk wheel body 31 having its peripheral portion 32 extending at an inclination to the wheel axis and adapted to receive a pneumatic tire carrying rim 33. While the tire is omitted from the illustration the usual valve stem is indicated at 34 clamped to the rim by the jam nut 35 and having an offset portion 36 which extends to the front face of the wheel through a slot-like opening 31ª in the disk and also through the tire or rim positioning clip 37 which may be in the form of a narrow individual clip or in the form of an annulus which bears upon the outer face of the disk, the inflation opening of the valve stem being closed by a cap 38. The tire-retaining member 37 is here shown as locally recessed at 37ª for the seating of the cap 38 and apertured at 37ᵇ to allow for play of the valve stem portion 36. This clip or ring is mounted as shown to effect a lateral bearing upon the rim 33 by means of adjusting bolts 39 with nuts 40. It will be observed that the slot 31ª extends from a point on the wheel disk inside of the valve stem to a point in the felly at the rear of the valve stem opening, thus enabling the rim and valve stem to be removed laterally from the wheel as in Fig. 1, when the nuts 40 are removed without having to withdraw the valve stem axially as is usually the case, and without disturbing the jam nut 35.

As here shown the felly is provided at intervals with spring tongues bearing outwardly against the bevelled surfaces of the inclined ribs 41 and 42 of the rim, the position of these tongues when unstressed being shown in dotted lines at 43 and 44 in said figure.

In Fig. 3 of the drawing the usual straight valve stem 45 is shown as extending through an aperture 46 in the felly which valve stem is provided with the usual valve insides. A filling nipple 47 is provided with a shoulder 48 bearing upon the rear face of the disk 49 and extending through the same to the front of the disk where it is provided with a threaded cap 50.

Threaded on the nipple of the valve stem between the shoulder 48 and the closure cap 50 is a bushing 51 having a flange, the tightening of the bushing serving to lock the stem in position relative to the disk by clamping the latter between the shoulder 48 and the flange of the bushing 51.

A tube 52 is clipped over the outer end of the valve stem and over the filling nipple being frictionally held thereon by means of binding wires or the like 53. Within that end of the tube adjacent the valve stem is a cored plug 54 centrally apertured at 55, and within the cored plug is a floating plate 56 eccentrically provided with an aperture 57 and spring pressed by means of the compression spring 58 in a direction towards the valve and tending to unseat the valve insides by bearing upon the teat 59 thereof.

It will be observed that in case of accident serving to strip the tube 52 from the valve stem 45 the cored plug will come away from the tube, thus relieving the valve from the pressure of the plate 56 and permitting the valve insides to seat.

It will be obvious that as previously indicated the illustrations of the wheel and rim structure are but exemplifications and that features shown in different views may be interchanged and obvious alterations made without departure from the invention in its essence. For instance, the clip 37 of Fig. 2 or the clip 60 of Fig. 3 may be substituted for the integral flange 20 of Fig. 1, the function of serving as a forward rim-retaining member being identical in each case; also the integral rim-retaining member of Fig. 1 may be substituted in the valve arrangement shown in Figs. 2 and 3; and similarly the rim-retaining members in Figs. 2 and 3 may be interchanged or substituted in the valve stem arrangement shown in Fig. 1; also instead of the disk following in its medial and peripheral portions the course indicated by the reference numerals 11 and 13 in Fig. 1, it may follow the course indicated by the reference numerals 11ª and 13ª, thereby providing annular pockets instead of short pockets 15 and 28 as illustrated in said figure, in either case the pocket 15 being closed by the rim-retaining member 20 or its equivalent and permitting of the rim and valve stem being removed from the wheel by a lateral movement.

A feature common to all of the embodiments illustrated and above described, is the safeguarding of the valve stem against injury by reason of relative movement of the parts while the wheel is in use or due to changes in relative position as the air pressure in the tire varies or to non-uniform assemblage when tires are changed. In Fig. 1, for instance, the loose fit of the valve stem in the cap 27 and the laterally elongated slot 61 in the rim provide for movement of the stem both radially and laterally relative to the rim; the extended slot 31ª of the disk and the large aperture 37ᵇ in the wheel member 37 of Fig. 2 permit of radial and lateral play of the stem; and in Fig. 3 the opening 46 permits of radial adjustment and lateral play of the stem in the disk periphery while the flexible tube 52 allows of give and take between the stem and the disk body.

Moreover, the large opening 61 of Fig. 1 permits of ready association with the rim of a tire provided with a valve stem, avoiding the difficulties encountered where the stem diameter more nearly conforms to that of the opening, and particularly is this true where an angle valve stem is used. This advantage is present in disassembling the tire and rim whether the rim is demountable, or has a removable flange.

I claim:

1. The combination of a disk wheel body and a pneumatic-tire-carrying rim mounted thereon, the disk having a forwardly facing pocket formed therein in line with the valve stem axis, the rim having a rim-retaining element associated therewith and closing off the pocket, the said element provided with an aperture for the passage therethrough of an offset continuation of the valve stem, whereby to afford access to the valve from the face of the wheel.

2. The combination of a disk wheel body and a pneumatic-tire-carrying rim mounted thereon, the disk having a forwardly facing pocket formed therein in line with the valve stem axis, the rim having a rim-retaining element associated therewith and closing off the pocket, the said element provided with a threaded aperture for the passage therethrough of an offset continuation of the valve stem, and a closure member threaded in the aperture about the valve stem whereby to afford access to the valve from the face of the wheel and to provide an extended support for the outer end of the stem.

3. The combination of a disk wheel body and a pneumatic-tire-carrying rim mounted thereon, the disk having an opening formed therein in line with the valve stem axis and forwardly thereof, the disk inwardly of the opening crossing the median plane of the wheel towards the rear, a rim-retaining element associated with the disk and rim and closing off the opening, the said rim-retaining element and the disk at the points of intersection of the valve stem axis therewith provided with apertures for the passage therethrough of an offset and a straight valve stem respectively, whereby to adapt the one wheel to the optional employment therewith of an offset or straight valve stem and to afford access to the stem from the face of the wheel.

4. The combination of a disk wheel body and a pneumatic-tire-carrying rim mounted thereon, the disk having an opening formed therein in line with the valve stem axis and forwardly thereof, the disk inwardly of the opening crossing the median plane of the wheel towards the rear, a rim-retaining element associated with the disk and rim and closing off the opening, the said rim-retaining element and the disk at the points of intersection of the valve stem axis therewith provided with threaded apertures for the passage therethrough of an offset and a straight valve stem respectively, a threaded cap for closing the valve and engaging within the used aperture, and a threaded plug to engage within and close the aperture not in use, whereby to adapt the one wheel to the optional employment therewith of an offset or straight valve stem and to afford access to the stem from the face of the wheel.

5. The combination of a disk wheel body and a pneumatic-tire-carrying rim mounted thereon, the disk having two forwardly facing pockets formed therein in line radially with the valve stem axis, the rim having a rim-retaining element associated therewith and closing off the outer one of the two pockets, the said element and outer wall of the inner pocket provided with apertures for the passage therethrough of an offset and a straight valve stem respectively, whereby to adapt the one wheel to the optional employment therewith of an offset or straight valve stem to afford access to the stem from the face of the wheel.

6. The combination of a disk wheel body and a pneumatic-tire-carrying rim mounted thereon, the disk having two forwardly facing pockets formed therein in line radially with the valve stem axis, the rim having a rim-retaining element associated therewith and closing off the outer one of the two pockets, the said element and outer wall of the inner pocket provided with threaded apertures for the passage therethrough of an offset and straight valve stem respectively, a threaded cap for closing the valve and engaging within the used aperture, and a threaded plug to engage within and close the aperture not in use, whereby to adapt the one wheel to the optional employment therewith of an offset or straight valve stem and to afford access to the stem from the face of the wheel.

In testimony whereof I have hereunto signed my name.

GEORGE H. FORSYTH.

CERTIFICATE OF CORRECTION.

Patent No. 1,657,533.                                        Granted January 31, 1928, to

GEORGE H. FORSYTH.

It is hereby certified that the above numbered patent was erroneously issued to "Motor Wheel Corporation, of Lansing, Michigan, a Corporation of Michigan", whereas said Letters Patent should have been issued to "Steel Wheel Corporation of Lansing, Michigan, a Corporation of Michigan", said Corporation being assignee by mesne assignments of the entire interest in said invention, as shown by the records of assignments in this office; and that the said Letters Patent should be read with this correction therein that the same may conform to the record of the case in the Patent Office.

Signed and sealed this 6th day of March, A. D. 1928.

M. J. Moore,
Seal                                                 Acting Commissioner of Patents.